(12) United States Patent
Habering et al.

(10) Patent No.: US 12,174,283 B2
(45) Date of Patent: Dec. 24, 2024

(54) SYSTEM FOR POSITION DETERMINATION USING AN ENERGY GUIDE CHAIN

(71) Applicant: IGUS GMBH, Cologne (DE)

(72) Inventors: Richard Habering, Cologne (DE); Konstantin Schmer, Cologne (DE)

(73) Assignee: IGUS GMBH, Cologne (DE)

( * ) Notice: Subject to any disclaimer, the term of this patent is extended or adjusted under 35 U.S.C. 154(b) by 559 days.

(21) Appl. No.: 17/593,471

(22) PCT Filed: Mar. 19, 2020

(86) PCT No.: PCT/EP2020/057654
§ 371 (c)(1),
(2) Date: Sep. 20, 2021

(87) PCT Pub. No.: WO2020/188044
PCT Pub. Date: Sep. 24, 2020

(65) Prior Publication Data
US 2022/0187407 A1    Jun. 16, 2022

(30) Foreign Application Priority Data

Mar. 20, 2019    (DE) .................... 20 2019 101 608.6

(51) Int. Cl.
*G01S 1/04*    (2006.01)
*B66C 7/00*    (2006.01)
(Continued)

(52) U.S. Cl.
CPC ............... *G01S 1/042* (2013.01); *B66C 7/00* (2013.01); *F16G 13/16* (2013.01); *G01S 1/74* (2013.01); *G01S 11/06* (2013.01)

(58) Field of Classification Search
CPC .................................. B66C 7/00; F16G 13/16
See application file for complete search history.

(56) References Cited

U.S. PATENT DOCUMENTS 3,248,487 A      4/1966  Dechantsreiter
4,315,129 A  *   2/1982  Wilkinson .............. E01B 29/24
                                                             219/98
(Continued)

FOREIGN PATENT DOCUMENTS

CN    104176463    12/2014
CN    105229336     1/2016
(Continued)

OTHER PUBLICATIONS

International Search Report from corresponding PCT Appln. No. PCT/EP2020/057654, dated Jul. 23, 2020.
(Continued)

*Primary Examiner* — Ernest G Tacsik
(74) *Attorney, Agent, or Firm* — Grossman, Tucker, Perreault & Pfleger, PLLC (57) ABSTRACT

Systems for position determination using an energy chain for guiding supply lines, which energy chain has a movable run which is fixed at an end to a driver and a stationary run wherein the driver moves back and forth along a track. The system has a sensor device for position determination, which is attached to the driver. In one variant, the system comprises guide components, arranged along the track, for lateral guidance of the energy chain of which components at least one has a reference component acting as a position reference. In another variant of the system, at least each nth chain link of the energy chain has at least one reference component attached thereto. In both variants, the sensor device for position determination interacts with individual reference components, which allows better and more reliable determination of the current position.

13 Claims, 3 Drawing Sheets

(51) Int. Cl.
*F16G 13/16* (2006.01)
*G01S 1/74* (2006.01)
*G01S 11/06* (2006.01)

(56) References Cited

U.S. PATENT DOCUMENTS

| | | | | |
|---|---|---|---|---|
| 4,964,891 | A * | 10/1990 | Schaefer | D04H 3/05 65/447 |
| 5,649,415 | A * | 7/1997 | Pea | F16G 13/16 248/51 |
| 8,061,510 | B2 | 11/2011 | Tout | |
| 9,372,138 | B2 * | 6/2016 | Riddall | H02G 11/006 |
| 9,476,480 | B2 | 10/2016 | Hermey et al. | |
| 10,309,488 | B2 | 6/2019 | Kemper et al. | |
| 10,378,610 | B2 | 8/2019 | Jaeker | |
| 10,471,297 | B1 * | 11/2019 | Smith | A63B 22/0087 |
| 2003/0173556 | A1 * | 9/2003 | Watson | H01J 37/20 254/389 |
| 2004/0026349 | A1 * | 2/2004 | Colgate | B66D 3/18 212/284 |
| 2004/0027708 | A1 * | 2/2004 | Suzuki | G11B 5/59633 360/75 |
| 2006/0092034 | A1 * | 5/2006 | Worthy | B65H 61/00 340/539.1 |
| 2013/0297690 | A1 * | 11/2013 | Lucero | G06Q 50/01 709/204 |
| 2013/0315437 | A1 * | 11/2013 | Kerschner | G06Q 30/018 705/317 |
| 2014/0228175 | A1 * | 8/2014 | Lemos | A63B 21/0783 482/93 |
| 2015/0135845 | A1 * | 5/2015 | Hermey | G01L 5/103 73/769 |
| 2015/0314985 | A1 | 11/2015 | Schoenauer et al. | |
| 2015/0330479 | A1 * | 11/2015 | Kemper | F16G 13/16 700/275 |
| 2016/0245402 | A1 * | 8/2016 | Fribus | B60R 25/252 |
| 2016/0347586 | A1 | 12/2016 | Hermey et al. | |
| 2016/0348757 | A1 * | 12/2016 | Jaeker | G01L 5/106 |
| 2017/0292588 | A1 * | 10/2017 | Hermey | H02G 11/006 |
| 2019/0326740 | A1 | 10/2019 | Hermey et al. | |
| 2020/0056947 | A1 | 2/2020 | Habering et al. | |
| 2020/0231193 | A1 * | 7/2020 | Chen | G01N 21/8851 |
| 2020/0256109 | A1 * | 8/2020 | Bean | E05F 15/41 |
| 2020/0386296 | A1 | 12/2020 | Hermey et al. | |

FOREIGN PATENT DOCUMENTS

| | | |
|---|---|---|
| CN | 106163966 | 11/2016 |
| DE | 29780389 | 1/1998 |
| DE | 20113742 | 12/2001 |
| DE | 102009037435 | 2/2011 |
| DE | 102012113082 | 6/2014 |
| DE | 202014104075 | 10/2014 |
| DE | 202016000501 | 4/2017 |
| DE | 202016107316 | 5/2017 |
| DE | 202016102134 | 6/2017 |
| DE | 202017102410 | 9/2017 |
| DE | 102016006061 | 11/2017 |
| DE | 202018101942 | 6/2018 |
| DE | 202019100009 | 1/2019 |
| JP | 2007-008638 | 1/2007 |
| JP | 2007-119102 | 5/2007 |
| JP | 2016-127374 | 7/2016 |
| JP | 2016-203748 | 12/2016 |
| WO | 2004/090375 | 10/2004 |
| WO | 2013/156607 | 10/2013 |
| WO | 2014/102170 | 7/2014 |
| WO | 2018/115528 | 6/2018 |

OTHER PUBLICATIONS

Written Opinion from corresponding PCT Appln. No. PCT/EP2020/057654, dated Jul. 23, 2020.
Office Action from related Chinese Appln. No. 202080029710.0, dated Mar. 23, 2023. English translation attached.
Office Action from related Japanese Appln. No. 2021-556259, dated May 30, 2023. English translation attached.
Office Action from related Singaporean Appln. No. 11202109536V, Apr. 20, 2023.
Bensky, "Wireless Positioning Technologies and Applications", Second Edition, published by Artech House, Boston/London, pp. 1-185, download from http://artech.cloudpublish.co.uk/123fastreader/37531/3847903/print/1/20 on Nov. 8, 2021.
BTG Positioning Systems brochure for "Trolley RFM 12 Positioning Sensor", Netherlands, 2 pgs.
PEPPERL + Fuchs GMBH brochure for "Das WEG-CODIER-SYSTEM", Manheim, Germany. No English translation available. 2 pgs.
Office Action from related Japanese Appln. No. 2021-556259, dated Nov. 7, 2023. English translation attached.

* cited by examiner

SYSTEM FOR POSITION DETERMINATION USING AN ENERGY GUIDE CHAIN

FIELD

The invention relates in general to a system for position determination with an energy guide chain for dynamically guiding supply lines, such as cables, hoses or the like.

BACKGROUND

Energy guide chains are typically assembled from chain links linked articulatedly in the longitudinal direction which provide a receiving space for the supply line. On displacement, they typically form a first run, which is fixed at the end to a connection point, and a mobile second run, which is fixed at the end to a moving end, wherein the moving end is displaceable or mobile, in particular linearly displaceable, back and forth along a route. Between the runs, the energy guide chain forms a co-traveling deflection arc.

In particular, the invention relates to a system for position determination having such a generic energy guide chain, in which a sensor device which is suitable for position determination is mounted at the moving end. Other than in this respect, the design of the energy guide chain or chain links is in principle irrelevant in the present case.

WO 2014/102170 A1 describes an energy guide chain for long displacement paths with a drive device which supports the moved run and is controlled by a control unit in order to reduce stress of the energy guide chain, in particular by tensile and shearing forces. One exemplary embodiment proposes a displacement sensor which is connected to the control unit for determining the displacement path in order to control the driving or braking action of the drive device. The displacement sensor ascertains the movement of the mobile connection region, but position determination is not proposed here. Such a displacement sensor would in principle be usable for position determination. However, when using a rolling rotary transducer, as presented by way of example in WO 2014/102170 A1, it is not possible to eliminate slippage, which means that reliable position determination is largely unachievable.

One aspect of WO 2018/115528 A1 proposes a sensor module which is arranged at an end region of the mobile run or at the moving end for quantitatively detecting a kinematic variable. A 3-axis acceleration sensor is, for example, proposed as the sensor. Such an acceleration sensor makes it possible to determine the travel path or distance traveled during operation.

Such a sensor module furthermore also enables determination of the instantaneous position by tracking movement over time, for example by suitable signal processing, and is in principle not very susceptible to failure.

A further aspect of WO 2018/115528 A1 (cf. FIG. 1A and FIG. 2 therein) utilizes distributed light barriers or proximity switches which provide only vague, rough knowledge of the position or spatial location of the energy guide chain. The same applies to the arrangement with light barriers in DE 20 2018 101 942 U1 or the subsequently published WO 2019/197284 A1 (FIG. 5A therein).

Permanently reliable position determination of the moving end or the traveling connection point of machine or installation during operation can only be achieved to a limited extent with both approaches. Among other things, they offer only limited position positional accuracy, since deviations in the determined relative position, for example due to slippage, or relative measurement errors add up over time. In addition, the above-stated approaches provide no information about the current absolute position in the idle state or on reinitialization.

SUMMARY

A first object of the present invention is therefore to propose an improved system for position determination with an energy guide chain which is robust in operation and can be installed at the place of use with the least possible effort. It is preferably intended to provide determination of the absolute position which is more reliable and/or more accurate in operation. Position determination is, however, in the present case not necessarily taken to mean a measurement in metrological terms but instead a quantitative ascertainment or detection of the position of the moving end.

The proposed solution is intended to be versatile and, in particular, be integrable into the control system of the mobile part of the machine or installation (hereinafter denoted machine part for brevity) supplied by the energy guide chain. The proposed system is in particular intended also to be capable of replacing existing or known separate systems for position determination.

The invention in particular relates to one-dimensional, i.e. 1D, determination or detection of the position of the moving end or moved machine part along a linear route, i.e. in relation to a notional line.

A first aspect or approach to solving the problem of the invention relates to an energy guide chain which is equipped with a guide arrangement with guide components arranged along the route for lateral guidance of the energy guide chain during displacement. What are known as guide channels with opposing side wall parts are typically used for this purpose, but other designs can also be considered. Such guide arrangements are used for long displacement paths of 5 m or more and usually over 10 m in order to prevent unwanted sideways movements.

The first aspect of the invention proposes that at least some of the guide components of the guide arrangement comprise at least one reference component which serves as a position reference for the sensor device. The sensor device may thus interact with such individual reference components in order to achieve comparatively reliable and robust position determination.

Due to the use of reference components, it is possible to limit the impact of relative differences or a determination of relative position to individual longitudinal portions of the displacement path. The reference components on the guide arrangement may thus, similarly to buoys, beacons or milestones, by utilized for better and more reliable determination of the current position, in particular an absolute position.

The reference component may be fastened to the respective guide component either as a separate component, optionally also detachably for maintenance purposes, or be produced as an integral component of the guide component. In both cases, the reference components are provided stationarily on the respective guide component.

On the basis of a position, which is known and fixed in space with regard to the supporting structure, of the components of the guide arrangement, for example of the individual side wall parts or floor guide elements, the location and position of the reference components provided thereon is inherently also fixedly specified and is predetermined or determinable as an absolute position.

A second aspect or second approach to solving the problem may also be used in energy guide chains without an additional guide arrangement.

The second aspect of the invention proposes that, in addition to the sensor device on the moving end, a further, second sensor device for position determination is mounted stationarily at the stationary connection point and that at least every $n^{th}$ chain link has at least one reference component which is mounted on or fastened to the chain link or is produced integrally therewith. As a result, depending on the traveling position of the moving end or moved run along the route, either the first sensor device or the second sensor device may interact with the individual reference components of the chain links and achieve a comparatively reliable or robust determination of the position, in particular of the moving end, or optionally also of the energy guide chain as a whole. In this case, the energy guide chain can itself serve as a material measure or a kind of measuring tape and the position can be detected as a position relative to the current location of the energy guide chain.

Both approaches can be utilized as solutions for position determination or ascertainment or position monitoring of the moved part of the installation/machine which is supplied by the energy chain. Virtually no additional installation effort, in particular in comparison with an expressly intended conventional positioning system, is required for either of the two above-stated concepts, since the reference components are installed together with the intended energy guide chain or the guide arrangement thereof.

Over the service life, the first approach permits overall more accurate determination, in particular also directly to obtain the absolute position, and also over very long displacement paths.

The second approach firstly permits determination of the relative position in respect of the chain links i.e. the length of the chain. It is, however, also possible, thanks to a known chain length and nominal course, to ascertain information about the current relative position or also absolute position of the moving end. In this approach, an existing component of the chain link, for example a crosspiece, may optionally be used as reference component, optionally also without additional design features, since the position thereof on the chain link is structurally predetermined.

Both approaches permit interaction of the reference components with the sensor device in the resting state, i.e. at a standstill, and on travel of the energy guide chain along the route. Both can be made robust with comparatively little effort. In comparison with conventional special systems for position measurement, both offer considerable installation savings, since the system is inherently installable together with the energy guide chain or guide arrangement thereof. In addition, both approaches are particularly advantageous with long displacement paths, i.e. systems of great length, for example >10 m.

The preferably linear route may extend horizontally and have an overall length of at least 5 m, typically >>10 m, and up to >100 m meters. The longer the route of the moved machine part, the greater are the savings in installation effort offered by the invention, in particular in comparison with known positioning systems, such as for example a system for acquiring the ongoing absolute position of a crane trolley, as is for example typical in container gantry cranes.

In a preferred embodiment, the sensor device interacts contactlessly with the individual reference components, such that typically no wear phenomena occur or an extended service life is achievable. This may in particular be achieved by electromagnetic sensor systems, preferably by radio, or by optical sensor systems. Acoustic sensor systems, preferably using ultrasound, are also conceivable. In principle, any kind of wave transmission in free space which permits distance determination or measurement can be used between the sensor device and individual reference components.

The reference components may be arranged on the guide arrangement or the chain links in a predetermined, in particular uniform, spacing, in relation to the longitudinal direction of the route, such that each reference position provides a direct statement about the distance from the start or endpoint of the route.

Irrespective of the arrangement, it is advantageous for reliable determination of an absolute position for each reference component to have a unique identifier which can be associated with a position, in particular an application-dependent absolute position, along the route, for example in the course of a reference run or during initialization and teaching of the system.

Radio-based position determination is advantageous for outdoor applications and is least susceptible to the effects of weather. The reference component may here take the form of a radio circuit with transmit capability and the sensor device may have a corresponding receiver. A reverse arrangement would in principle also fall within the scope of the invention, but would involve greater cabling or signal transmission effort.

Radio signals offer three fundamental characteristics which enable distance measurement, namely signal strength, time of flight and direction of incidence. In preferred embodiments, a lateration or one-dimensional determination is preferred and therefore the distance measurement methods used are preferably those which are based on time of flight (TOF) and/or received signal strength (RSS), i.e. one of these characteristics:

i) Time of flight (TOF): the distance between transmitter and receiver corresponds to the electromagnetic time of flight of the transmitted signal. Distance can be determined from a measurement of the time of arrival (TOA) of a signal at a receiver with a known transmission time (start time) or from the difference of the reception time at different locations (arrival time difference). The phase of the received signal or phase of arrival (POA) may be considered an expression of the time of flight; and/or ii) received signal strength (RSS). The power density of an electromagnetic wave is inversely proportional to the square of the distance from the source. If the transmit power is known or specified, it is possible to estimate the distance from signal strength measurements.

For one-dimensional distance determination, it is possible to perform a simple lateration; if preceding position(s) are known, there is no need to receive a plurality of reference components in order to determine the position along the route.

The details of implementation or measuring technology are not important for the invention, it being possible to use any suitable technology known to a person skilled in the art. With regard to radio-based distance measurement, reference is made to the teaching of the textbook: Bensky, Alan (2016) "Wireless Positioning Technologies and Applications" (2nd edition; publisher: Artech House Publishers; ISBN-10: 1608079511). Suitable radio-based measuring technology is for example offered for sale by BTG Positioning Systems (NL-3261 LB, Netherlands) under the name "RFM1.2".

An energy-saving solution involving little cabling effort can be obtained by using a radio-based reference component or radio component in the form of a passive radio circuit, preferably a passive transponder, in particular an RFID transponder. Such radio circuits can in particular be supplied from the radio power of the polling transmitter of the sensor device and in this case do not require their own power supply, i.e. also no supply line.

Alternatively, the reference components may also take the form of active radio circuits, in particular wired radio circuits. This facilitates, for example, the synchronization of all the reference components with a system time for sending time stamps for a time of flight measurement in the sensor device.

The sensor device may take the form of a transceiver for passive radio references, for example similar to an RFID reader, or also of a simple receiver for active radio references if, for example, the active radio references spontaneously transmit radio signals without polling, for example with a transmission time stamp and/or identifier of the reference component.

In active or passive radio components as position reference, each sensor device has an antenna arrangement suitable for the radio technology used. Said arrangement is preferably dimensioned such that at least one radio component is located in the effective reception range of the antenna arrangement in each travel position along the route.

The radio components used preferably operate in an IFM frequency band. Any common radio technology can be used, for example WLAN/WiFi technology according to the IEEE 802.11 protocol family, which is particularly suitable for time of arrival (TOA) measurement, or indeed Bluetooth and ZigBee according to the IEEE 802.15 protocol family, which is particularly suitable for received signal strength (RSS) measurements. Preferably, however, an energy-saving solution such as RFID or Bluetooth Low Energy (BLE) is used. Even without additional measures, precision in the centimeter range can be achieved with pure radio reference components.

Alternatively or in addition to radio technology, references can also be optically and/or electromagnetically, for example inductively or capacitively, readable markings, in particular encoded or code markings, for example with a barcode structure. Such markings preferably serve as material measures and may be detected using an optical and/or electromagnetic sensor of the sensor device, for example by contactless scanning. Detection based on reading or scanning markers, for example a marker track, is very robust and can offer elevated precision, in particular in the event of photoelectric scanning with photodetectors or light sensors, optical detectors, optoelectronic sensors or the like. Encoded markings which may for example be considered are a position encoding system with encoding rail with optical scanning, as is available for example under the name "WCS" from Pepper-Fuchs (DE-68307 Mannheim, Germany). An encoding track based on the principle of such an encoding rail may here preferably be incorporated as an integral component by recesses in the side wall part of the guide channel, for example by appropriate post-machining. However, even a simple perforated strip or track without encoding, for example with constant hole spacing, permits relatively precise absolute position determination and is easier to produce.

A complementary, additional relative measurement by incremental or absolute encoder can also be provided for the distance between two radio reference components in order to achieve still more precise position determination and simultaneously reduce relative measurement errors by referencing. Markings may be less sensitive to electromagnetic interference and, if necessary, like radio solutions, can also be used in adverse environmental conditions.

In a preferred embodiment of the first aspect with guide arrangement, the latter takes the form of a guide channel which comprises side wall parts. Such side wall parts are arranged stationarily in the longitudinal direction in a continuous succession on both sides along the route. Two opposing side wall parts here in each case form a portion of the guide channel. At least one reference component is thus preferably provided on at least every $n^{th}$ side wall part, in particular on each side wall part, of one side of the guide channel. The side wall parts fixedly installed on the application-dependent support structure may thus be utilized as supports for the reference components, such that the latter are inherently installed in one step with the side wall parts.

In principle, the reference components are preferably fastened in a specified, regular spacing to the guide arrangement in distributed manner along the route.

If the guide arrangement is constructed as a guide channel from side wall parts, preferably of per se identical construction, assembled in the longitudinal direction, at least one reference component is preferably provided on each side wall part, for example a marking is incorporated, or fastened, for example a radio component mounted, during production of the side wall parts.

In one embodiment, a further reference component in the form of a radio component may be provided on the side wall part in addition to a marking on the side wall part. The sensor device may then in particular comprise an incremental transducer which interacts with the marking track by scanning, for example by optical scanning, and an antenna arrangement which reads out an identifier of the radio component in order to obtain absolute position information.

The side wall parts preferably take the form of metal profiles, in particular aluminum profiles or sheet steel profiles, of an identical basic shape and a cross-sectional profile with fastening functions. Side wall parts made of plastics are also conceivable. A marking as reference component is preferably provided on the upper half of the side wall part, in particular as a marking track which can be detected from the outside, for example as an encoding track of a barcode structure type. Such marking may be provided on, or incorporated into, the side wall part for example by a recess in the profile material (machining), paint application, laser printing or the like. Application of a separately fabricated encoding track also falls within the scope of the invention.

The invention accordingly also relates to a side wall part of a guide channel for an energy guide chain, which side wall part is distinguished in that at least one stationary reference component, in particular a radio component or optically and/or electromagnetically detectable markings, is provided on the side wall part, which reference component is configured to interact as a position reference with a sensor device for position determination.

As an alternative to guide channels with side wall parts, guide arrangements are also feasible which have as their guide components floor guide elements fastened distributed at a predetermined mutual spacing along the route, i.e. without continuous side walls for both runs. Such guides are offered for sale by the applicant (igus GmbH—D-51147 Cologne) under the tradename "Autoglide" or "Guidelite". Even with a guide arrangement distributed in this way, at least every nth floor guide element, in particular every floor guide element on one side, may comprise a reference component, preferably a radio component.

If no guide arrangement is present, then according to the second aspect every reference component may be attached to a chain link of the energy chain. In one embodiment, the reference component may comprise a crosspiece of a chain link or be attached to a crosspiece of a chain link or integrated therein. In this case too, the reference component may be embodied as optically and/or electromagnetically detectable markings, in particular code markings, or as a radio component, preferably a passive radio component.

The proposed system for position determination may be used in particular by the control system of the machine or installation supplied by the energy chain. Thus, an installation control system is preferably provided for controlling the movement of a mobile machine part comprising the moving end, wherein, for position determination of the mobile machine part, this control system is connected for signaling with the sensor device of the system.

The invention is suitable not only but in particular also for use in a crane, in particular a gantry crane or bridge crane, in which a crane trolley with a relatively long linear displacement path is used, such as for example on a container gantry crane or the like. In this case, the crane trolley is typically connected at the moving end with an energy guide chain, for example for power supply and drive control of a container spreader, and the crane has a control system connected for signaling with the sensor device and which establishes or monitors the position of the crane trolley on the basis of the position determination according to the invention and optionally controls movement thereof on the basis thereof.

The proposed system for position determination may be used particularly preferably in combination with a force measurement system for position-dependent force measurement at the energy guide chain. Such force measurement systems were described by the applicant in WO 2004/090375 A1 and WO 2013/156607 A1. With very long displacement paths, for example >100 m, it is necessary to define the shearing/tensile force limits defined for recognition of a fault or safety shutdown as a function of the instantaneous position of the energy guide chain, since the necessary starting forces are markedly higher in the fully advanced end position than in the other end position due to virtually the entire supported run needing to be moved, cf. WO 2004/090375 A1. Accordingly, with the proposed system for position determination in combination with a force measurement system, for example according to WO 2004/090375 A1 or WO 2013/156607 A1, the teaching of which in this respect is included herein, a robust integrated system can be offered in which it is not necessary to obtain position information from the control system of the supplied installation or machine.

Optionally, the system for position determination may also be used by the installation or machine control system (for example of a crane) as a source of the position information relating to the moving part.

The proposed system, in particular according to the first aspect, may also achieve high position determination precision and accordingly be used for continuous absolute position measurement of a displaceable machine or installation part, for example a linearly displaceable crane trolley, supplied by the energy guide chain.

BRIEF DESCRIPTION OF THE DRAWINGS

Further features and advantages of the invention may be inferred without limitation of the scope of protection from the following, more detailed description of preferred exemplary embodiments made on the basis of the appended figures, in which.

DETAILED DESCRIPTION

Figure 1:
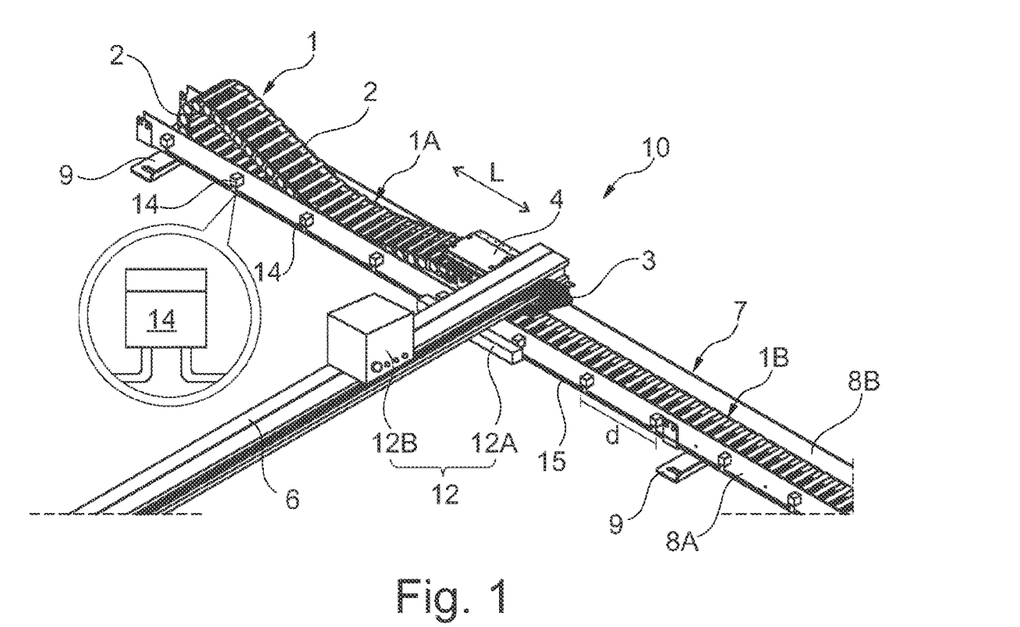
FIG. 1: shows a schematic diagram in perspective view of a first, preferred exemplary embodiment for radio-based position determination with an energy guide chain guided in a guide channel for particularly long displacement paths, wherein only a sub-portion is shown.
Figure 4A:
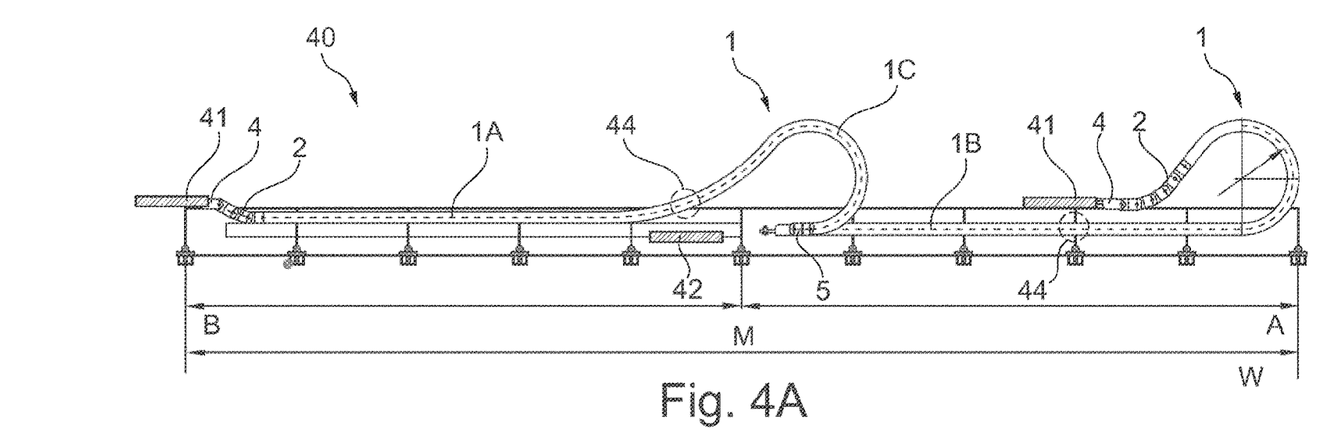
FIGS. 4A-4B: show schematic side views of an exemplary embodiment for position determination on the basis of an energy guide chain which is also suitable for applications without a guide channel.

FIG. 1 shows an energy guide chain 1 (hereinafter referred to as "energy chain" for short) composed of articulatedly interconnected chain links 2 for dynamic, protected guidance of lines 3 along a displacement path. One end of the energy chain 1 is fixed to a moving end 4 and the other end to a stationary connection point 5 (FIG. 4A). At the moving end 4, the lines 3, for example power supply and control lines, emerge from the energy chain 1 and go to a mobile consumer, here shown only entirely schematically in the form of a girder element 6. The energy chain 1 in FIG. 1 is specifically designed for long displacement paths, with an upper run 1A which slides or rolls over the lower run 1B. In operation, the energy chain 1 travels, here for example horizontally, along a straight longitudinal direction L.

The energy chain 1 is to this end laterally guided in a guide channel 7, wherein the guide channel 7 extends linearly in the longitudinal direction L over the total length W (FIG. 4A) of the displacement path of the energy chain 1 with only a portion being shown here. The guide channel 7 is constructed from in each case opposing individual side wall parts 8A, 8B which are fastened together via installation profiles 9 and to a load-bearing structure. Side wall parts 8A, 8B which may be considered in FIG. 1 are in particular identically constructed profile parts of aluminum or steel of conventional design and specified length (for example 2 m). Identically constructed side wall parts 8A, 8B may be used on both sides of the guide channel 7 in the system 10 according to FIG. 1. The side wall parts 8A, 8B are interconnected in succession without gaps in the longitudinal direction or stationarily fastened to a load-bearing structure (not shown), for example using the installation profiles 9. Individual side wall parts 8A, 8B thus immediately follow each other on each side of the guide channel 7 in accordance with the linear direction of travel of the energy chain 1 or the moving end 4. The individual side wall parts 8A, 8B have a predefined installation position, i.e. fixedly specified position on the installation/machine.

FIG. 1 further shows a particularly preferred system 10 for position determination of the moving end 4 or of the mobile part 6 of the installation or machine fixedly connected thereto. The system 10 comprises a sensor device 12, which in FIG. 1 substantially consists of an antenna device 12A with a radio antenna and a computer-assisted evaluation unit 12B. The evaluation unit 12B is connected for signaling to the antenna device 12A and configured inter alia for evaluating radio signals. The antenna device 12A may be designed to receive and/or transmit radio signals, in FIG. 1 primarily to receive them. The system 10 further comprises a plurality of individual radio-based reference components 14 which interact for position determination with the sensor device 12. The radio-capable reference components 14 are here provided as separate components in a fixedly specified spacing d on one side of the guide channel 7. In FIG. 1, in each case a plurality of reference components 14 are fastened as separate components to an assigned side wall part 8A. Reference components 14 are here provided on the guide channel 7, distributed in a constant spacing d, over the total length W of the displacement path W (FIG. 4A). After installation of the guide channel 7, the position of the individual reference components 14 is thus likewise predetermined.

In FIG. 1, the reference components 14 of the positioning system 10 have a wired interconnection, namely via a suitable bus line for power supply and data exchange. By means of the bus line 15 it is in particular possible to synchronize a time unit, which is held in the individual reference components 14, for all the reference components 14 with a current system time of the sensor device 12. As FIG. 1 further indicates, the antenna device 12A is dimensioned such that always at least one reference component 14, preferably at least two reference components 14, is/are located in the reception range of the antenna device 12A. For position determination, each reference component 14 transmits a radio signal which includes a unique identifier, for example address, of the respective reference component 14 and a time stamp corresponding to the outgoing transmission time of the radio signal. On this basis, the evaluation unit 12B can perform a precise measurement or calculation of time of flight (TOF) via corresponding radio signals which have been received by the antenna device 12A, in particular by comparing the transmission time stamp of the reference component 14 with a reception time stamp of the corresponding radio signal. On the basis of a corresponding TOF measurement, the one-dimensional position of the sensor device 12 in relation to the previously known position of the considered reference component 14 and thus of the moving end 4 in the longitudinal direction L can be precisely determined. Precision can be computationally increased by evaluating times of flight (TOF) of a plurality of reference components 14 in the reception range of the antenna device 12A. Alternatively or in addition to TOF measurements, distance can also be quantitatively determined on the basis of radio signal strengths using the RSS measurement principle.

In FIG. 1, the reference components 14 are thus implemented as active radio circuits, for example ZigBee modules, the predetermined position of which is taught via the unique identifier for example in the course of initialization or during a reference run by the evaluation unit 12B.

The proposed positioning system 10 can be operationally installed with only slight additional expenditure in comparison with a conventional energy chain 1 with a guide channel 7 (without positioning system). For this purpose, the reference components 14 may in particular be fastened ex works to the individual side wall parts 8, for example in expressly prefabricated receptacles on the outer wall of the side wall part 8A which at the same time ensure the desired predefined constant interval spacing D. Onsite wiring of the reference components 14 to the bus line 15 can be easily, quickly, and reliably achieved using conventional industrial connectors. The sensor device 12 may in turn be fastened stationarily and in prefabricated manner to the moving end 4 and be supplied therewith in an operational state (not shown here). The evaluation unit 12B may furthermore be configured to be connected to one or more force sensors on the moving end 4 for measuring tensile and shear forces on the energy chain 1, cf. WO 2013/156607 A1, in order to implement position-dependent force measurement. The evaluation unit 12B can furthermore continuously transmit obtained position information to a control system (not shown) of the supplied machine/installation, such that there is no need for a conventional, separate positioning system.

Figure 2:
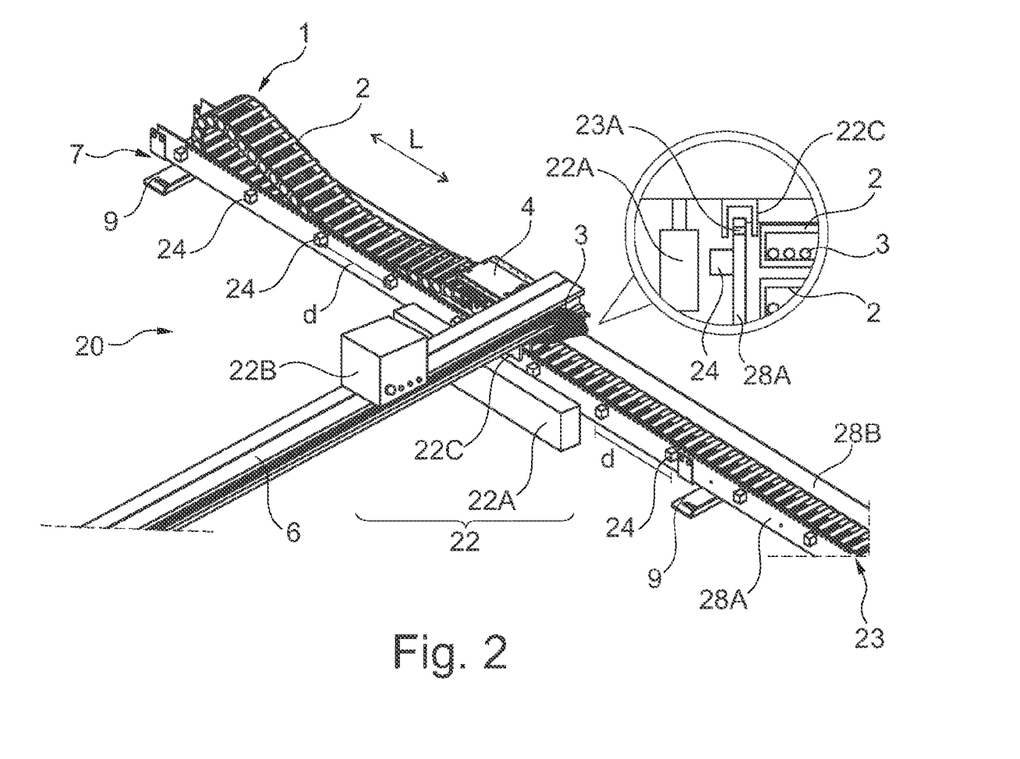
FIG. 2: shows a schematic diagram in perspective view of a second exemplary embodiment for combined radio-based and optical position determination, wherein only a sub-portion is shown.

FIG. 2 shows an alternative system 20 for position determination according to a combined optical and radio-based principle. In FIG. 2, passive radio circuits or radio components 24 are provided on one side of the guide channel 7 as reference components in a specified spacing d from one another. The radio components 24 are installed as separate components on the individual side wall parts 28A. The radio components 24 serve as a rough position reference and are polled by radio with the assistance of an antenna device 22A, which is fastened stationarily to the moving end 4 and co-travels therewith. Radio components 24 which may be used are for example passive COTS-RFID transponders which typically return a unique identifier and are supplied by the radio field of an antenna device 22A configured as an RFID reader or as a transceiver. Radio signals received by the antenna device 22A are also evaluated in the system 20 by an evaluation unit 22B, but in this case in order to obtain rough, absolute position information based on a previously known, learned assignment of the individual identifiers of the radio components 24 along the longitudinal direction L. More precise position information is ascertained in FIG. 2 with the sensor device 22 by combination with an electrooptical incremental transducer principle. For this purpose, an optical scanning head 22C, for example having a light source and light sensor, is connected to the evaluation unit 22B. The scanning head 22C overlaps the upper end of the side wall parts 28A during displacement in the longitudinal direction L. In so doing, the scanning head 22C interacts optically with a perforated track 23. The perforated track 23 is incorporated into the upper end of each side wall part 28A of one side of the guide channel 7, i.e. these side wall parts 28A are custom products (the other side walls 28B, in contrast, are conventional profiles). The perforated track 23 is formed by through-holes 23A in the side wall parts 28A which are provided along a line parallel to the longitudinal direction L. For ease of manufacture, the holes 23A are here arranged at a preferably constant pitch from one another, wherein absolute position information may, however, also assigned by changes in spacing or cross-section. The perforated track 23 is identically prefabricated in each side wall part 28A, for example by stamping or the like of the profile part. Holes 23A may, of course, also be replaced by slots or other openings.

In FIG. 2, the scanning head 22C may operate according to the imaging measurement principle, i.e. carry out photoelectric scanning of the perforated track 23 during movement in the longitudinal direction. According to the principle of an incremental transducer, the scanning head 22C has for this purpose, for example, a light source and an opposing photodetector, preferably a double arrangement with two pairs of light sources and photodetectors offset in the longitudinal direction L by half the pitch of the holes 23A. The side wall part 28A, in particular the perforated track 23 prefabricated therein, in this case forms for the scanning head 22C a material measure along the entire route W for the purposes of length and/or speed measurement. On the basis of the pulses from the scanning head 22C, suitable signal evaluation in the evaluation unit 22B permits relatively precise determination of, for example, the travel speed of the moving end 4 in the longitudinal direction L. Computational signal processing can in turn be used to achieve more precise determination of the absolute position, in particular in conjunction with relatively rough position information which is obtained in parallel on the basis of the radio components 24 and the antenna device 22A. The combined sensor systems of the system 20 are in particular advantageous when, as is usual with passive radio components 24 without a power supply, low data rates do not permit precise time of flight measurement or indeed synchronization is not possible.

Figure 3:
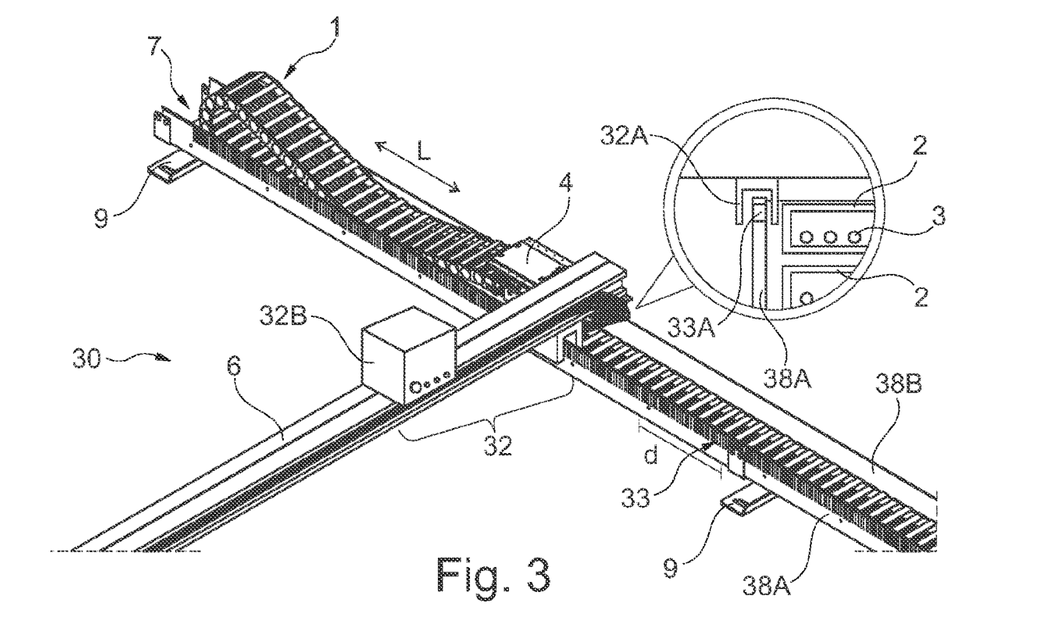
FIG. 3: shows a schematic diagram in perspective view of a third exemplary embodiment for optical position determination, wherein only a sub-portion is shown.

FIG. 3 shows a further positioning system 30 which, however, operates with a purely optical mode of action and nevertheless yields relatively precise absolute position information. The sensor device 32 here comprises just one optical or electrooptical scanning head 32A, which is connected for signaling to an evaluation unit 32B. In the system 30, an encoding track 33 consisting of individual slots 33A in the side wall part 38A is provided, in each case at the upper end, for position determination on one side of the guide channel 7 in each side wall part 38A, i.e. along the entire length W of the route. The dimensions of the slots 33A in the longitudinal direction L is in each case different in accordance with a predetermined encoding system. The encoding track 33 may preferably be encoded differently in all the side wall parts 38A, such that an exact, absolute position of the moving end 4 can be continuously ascertained over the complete route W. Position is here ascertained, as is known in position encoding systems with an encoding rail, by decoding the signals which are supplied to the evaluation unit 32B by the scanning head 32A using suitable technology known to a person skilled in the art, in particular computer-implemented or digital technology. Teaching may, for example, proceed by an initialization reference run of the moving end 4 with the sensor device 32 between the two end points A and B (FIG. 4A). As in FIG. 3, the encoding track is preferably, but not necessarily, implemented as an integral component of the side wall parts 38A of the guide channel 7, i.e. is not provided as a separate encoding rail. In addition to optical scanning, electromagnetic scanning or visual scanning using image recognition technology can also be used.

All of systems 10, 20, 30 according to FIG. 1 to FIG. 3 are robust against disruptive environmental influences and are particularly suitable for outdoor use, for example in heavy industry or on large crane systems, such as container gantry cranes.

Figure 6:
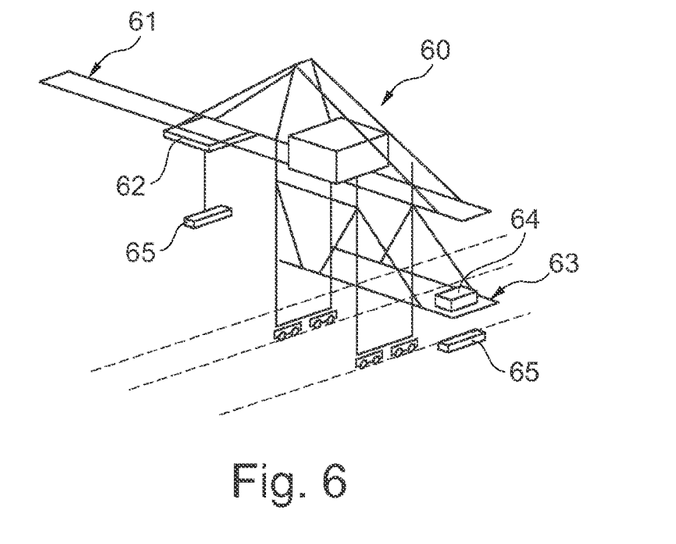
FIG. 6: shows a (container) gantry crane as an exemplary application of a system according to FIGS. 1-3.

FIG. 6 shows by way of example of application a bridge or gantry crane, here more specifically a container gantry crane 60 or ship-to-shore crane for ISO shipping containers 65. The exemplary container gantry crane 60 has an upper crane bridge 61 with a first crane trolley 62 and a lower crane bridge 63 with a second crane trolley 64, each of which here travel linearly, for example over a distance of >10 m. Both crane trolleys 62, 64 are typically supplied by energy chains 1, for example for power supply and drive control of a container spreader. A system 10, 20, 30 according to FIGS. 1-3, particularly preferably a system 10 according to FIG. 1, may be provided as position-measuring system for controlling the crane trolleys 62, 64. Installation of a separate position-measuring system, as has hitherto been conventional, is here not required. The system 10, 20, 30 according to FIGS. 1-3 is here installed together with the guide channel 7 and the energy chain 1, for example on a crane girder, i.e. no additional installation effort is required. In addition, lines are typically in any event already routed from the fixed connection point 5 of the energy chain (FIG. 4A) to the crane control system. A system 10, 20, 30 according to FIGS. 1-3 can also advantageously be used in other types of crane, for example RMG harbor cranes, and other applications in heavy industry, in particular for position monitoring or control of the supplied machine part to which the moving end 4 is fastened.

Figure 4B:
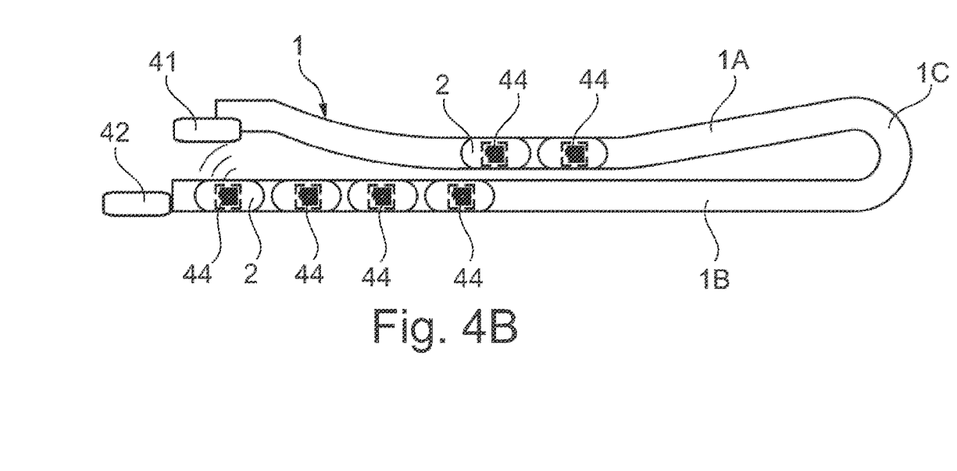
Figures 5A, 5B:
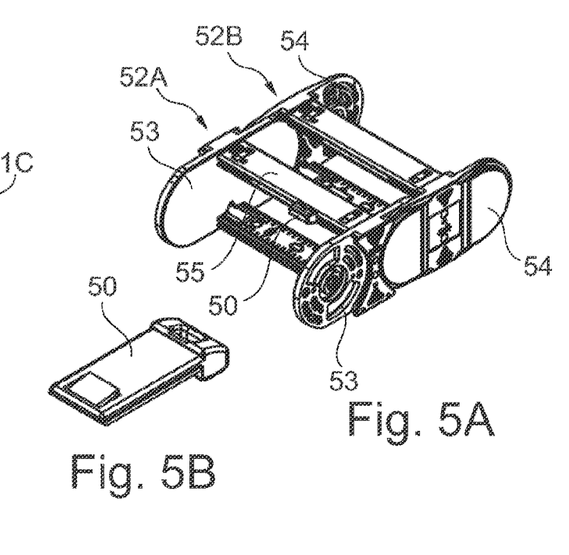
FIGS. 5A-5B: show chain links (FIG. 5A) of an exemplary energy guide chain and a radio module as reference component (FIG. 5B) for retrofitting to a crosspiece of a chain link.

Finally, FIGS. 4A-4B schematically show a variant of a detection system 40 of an energy chain 1 which is also usable without a guide channel 7. The reference components 44, here in the form of radio circuits, for example RFID transponders, are provided on every $n^{th}$ chain link 1, for example on every second or third, or indeed every chain link 1 of the energy chain 1. A first antenna 41 is provided on the moving end 4, which antenna is effective on displacement in the longitudinal direction L over the first sub-section from the first endpoint A to the middle M of the complete route W, i.e. from the fixed connection point 5 of the energy chain. As it travels over this sub-section, the first antenna 41 can sequentially detect the reference components 44, for example RFID identifiers, on the chain links 1 on the resting lower run in order to obtain absolute position information therefrom. A stationary second antenna 42 is provided close to the fixed connection point 5, which second antenna is effective over the second sub-section from the middle M of the complete route W to the second endpoint B and detects reference components 44 in the moving upper run 1B in order to obtain absolute position information therefrom. The detection system 40 may alternatively also be used for ascertaining position or complementarily thereto in order to detect whether the energy chain 1 is moving correctly or as intended, for example whether the upper run 1A is rearing up in an unwanted manner. The reference components 44 are preferably provided for this purpose on the side of the energy chain 1 located on the inside in the deflection arc 1C (cf. FIG. 4A), for example on crosspieces 55 (FIG. 5A). The reference components 44 may alternatively be arranged, for example, on the side plates 53, 54 or side parts of selected chain links 2 (cf. FIG. 4B).

The reference components 44 may for example be mounted in the form of retrofittable radio reference modules 50 which are insertable into conventional crosspieces 55 of the chain links 52A or 52B (cf. FIGS. 5A-5B). Crosspieces 55 are typically provided in chain links 1 or 52A, 52B in order to connect the side plates 53 or 54 of the chain links 1 or 52A, 52B. Purely by way of example, FIG. 5A shows chain links 52A, 52B with alternate internal and external plates for long complete routes W, but the invention is usable with any desired energy chains 1.

As an alternative to the radio-based principle according to FIGS. 4-5, purely optical identification, for example by counting the crosspieces 55 using light barriers, is also possible. An additional third stationary sensor is here optionally provided in the end region close to the endpoint B, since in the end position the deflection arc 1C is typically raised up vertically from the middle M, i.e. crosspieces 55 are here difficult to detect optically.

The application shown in FIG. 6 of a system 10, 20, 30 according to the invention in a crane 60 is purely exemplary, the invention advantageously being usable in many fields, in particular in applications with long displacement paths in which, for example for automation purposes, the position of the moving part of the installation/machine supplied by the energy chain 1 must be detected.

The system 10, 20, 30, 40 according to the invention may therefore in particular advantageously be used in conjunction with sliding or rolling energy chains 1, which are particularly suitable for long displacement paths, i.e. with energy chains 1 of per se known construction, in which the mobile upper run 1A can slide or roll over the resting lower run 1B, as is apparent in FIGS. 1-3.

LIST OF REFERENCE SIGNS

FIG. 1
1 Energy guide chain
1A Upper run
1B Lower run
2 Chain link
3 Line
4 Moving end
6 Girder element (supplied part)
7 Guide channel
8A, 8B Side wall part (guide channel)
9 Installation profile
10 Positioning system
12 Sensor device
12A Antenna device
12B Evaluation unit
14 Reference component (radio)
15 Bus line
L Longitudinal direction
FIG. 2
1 Energy guide chain
7 Guide channel
20 Positioning system
22 Sensor device
22A Antenna device
22B Evaluation unit
22C Scanning head (optical)
23 Perforated track (optical)
23A Hole
24 First reference component (radio)
28A, 28B Side wall part (guide channel)
L Longitudinal direction
FIG. 3
1 Energy guide chain
4 Moving end
7 Guide channel
30 Positioning system
32 Sensor device
32A Scanning head (optical)
32B Evaluation unit
33 Encoding track (optical)
33A Slot
38A, 38B Side wall part (guide channel)
L Longitudinal direction
FIGS. 4A-4B
1 Energy guide chain
1A Upper run
1B Lower run
1C Deflection arc
2 Chain link
4 Moving end (mobile connection point)
5 Fixed/static connection point
40 Positioning system
41 First antenna
42 Second antenna
44 Reference component (radio)
A First end position
B Second end position
M Middle
W Complete route FIGS. 5A-5B
50 Radio reference module
52A; 52B Chain link
53, 54 Side plate
55 Crosspiece
FIG. 6
60 (Container) gantry crane
61 Upper bridge
62 Crane trolley
63 Lower bridge
64 Crane trolley
65 ISO shipping container

What is claimed is:

1. A system for position determination with an energy guide chain for guiding supply lines, the energy guide chain comprising a first run, which is fixed at the end to a connection point, and a mobile second run, which is fixed at the end to a moving end, the moving end being displaceable back and forth along a route, comprising:
    a guide arrangement with guide components arranged along the route for lateral guidance of the energy guide chain during displacement; and
    a sensor device for position determination which is mounted at the moving end and is configured to determine an absolute position of the moving end;
    wherein at least some guide components have thereon at least one reference component serving as position reference of a respective absolute position, so that a plurality of position references is distributed along the route, and in that the sensor device interacts with individual reference components to determine the absolute position of the moving end;
    wherein the guide arrangement is a guide channel;
    wherein the guide components comprise side wall parts;
    wherein the side wall parts are arranged stationarily in a longitudinal direction in a continuous succession on both sides along the route, and each side wall part of a succession of several side wall parts on one side of the guide channel comprises a plurality of separate reference components fastened to the side wall part.

2. The system according to claim 1, wherein the sensor device interacts contactlessly with the individual reference components by radio, optically, and/or acoustically.

3. The system according to claim 2, wherein the reference component takes the form of a radio circuit with transmit capability and the sensor device has a corresponding receiver.

4. The system according to claim 2, wherein the reference component takes a form of a radio component, namely a passive radio circuit, or an active radio circuit and each sensor device comprises a corresponding antenna arrangement.

5. The system according to claim 1, wherein the reference components are arranged in a predetermined uniform spacing, and/or each reference component has a unique identifier which is associable with an absolute position, along the route.

6. The system according to claim 1, wherein the at least one reference component takes the form of encoded optical and/or electromagnetic markings, which are detectable using an optical and/or electromagnetic sensor of the sensor device.

7. The system according to claim 1, comprising an installation control system for controlling the movement of a mobile machine part which comprises the moving end, wherein the control system is connected for signaling to the sensor device for position determination of the mobile machine part.

8. Use of a system according to claim 1 for continuous measurement of the absolute position of a displaceable machine or installation part supplied by the energy guide chain.

9. The system according to claim 1, wherein the sensor device interacts with the individual reference components electromagnetically, wherein the reference components are inductively or capacitively readable markings.

10. The system according to claim 1, wherein the sensor device interacts with the individual reference components by ultrasound.

11. A crane, comprising a linearly displaceable crane trolley and a system according to claim 1, wherein the crane trolley is connected at the moving end to the energy guide chain and the crane comprises a control system which is connected for signaling to the sensor device.

12. A system for position determination with an energy guide chain for guiding supply lines, the energy guide chain comprising a first run, which is fixed at the end to a connection point, and a mobile second run, which is fixed at the end to a moving end, the moving end being displaceable back and forth along a route, comprising:

a guide arrangement with guide components arranged along the route for lateral guidance of the energy guide chain during displacement; and a sensor device for position determination which is mounted at the moving end and is configured to determine an absolute position of the moving end;

wherein each of a succession of guide components has attached thereon a plurality of reference components, each reference component serving as position reference of a respective absolute position and each reference component has a unique identifier which is associable with an absolute position, along the route, so that a plurality of position references is distributed along the route, and in that the sensor device interacts with individual reference components to determine the absolute position of the moving end;

wherein the sensor device interacts with the individual reference components, each reference component comprising a radio circuit with transmit capability and the sensor device having a corresponding receiver, wherein the radio circuit transmits the unique identifier to the receiver of the sensor device.

13. The system according to claim 12, wherein the reference components are RFID transponders.

\* \* \* \* \*